United States Patent
Harada

[11] Patent Number: 5,508,929
[45] Date of Patent: Apr. 16, 1996

[54] VEHICLE CONTROL APPARATUS

[75] Inventor: Hiroshi Harada, Susono, Japan

[73] Assignee: Toyota Jidosha Kabushiki Kaisha, Toyota, Japan

[21] Appl. No.: 185,011

[22] Filed: Jan. 24, 1994

[30] Foreign Application Priority Data

Feb. 25, 1993 [JP] Japan .................................. 5-063426

[51] Int. Cl.$^6$ ........................................................ B62D 7/14
[52] U.S. Cl. ........................ 364/424.05; 180/142; 280/707
[58] Field of Search ........................ 364/424.05, 426.02, 364/426.03; 180/197, 140, 141, 142; 280/707

[56] References Cited

U.S. PATENT DOCUMENTS

| | | | |
|---|---|---|---|
| 4,941,097 | 7/1990 | Karnopp et al. | 180/79.1 |
| 4,998,593 | 3/1991 | Karnopp et al. | 180/79.1 |
| 5,001,636 | 3/1991 | Shiraishi et al. | 364/424.05 |
| 5,001,637 | 3/1991 | Shiraishi et al. | 364/424.05 |
| 5,134,352 | 7/1992 | Matsumoto et al. | 364/426.02 |
| 5,136,507 | 8/1992 | Shiraishi et al. | 364/424.05 |
| 5,141,069 | 8/1992 | Yasui | 180/79.1 |
| 5,225,983 | 7/1993 | Ohmura et al. | 364/426.02 |
| 5,257,189 | 10/1993 | Asada | 364/426.02 |
| 5,261,503 | 11/1993 | Yasui | 364/424.05 |
| 5,333,058 | 7/1994 | Shiraishi et al. | 364/426.02 |
| 5,379,218 | 1/1995 | Jacobi et al. | 364/426.02 |
| 5,379,222 | 1/1995 | Anan et al. | 364/424.05 |
| 5,386,365 | 1/1995 | Nagaoka | 364/424.05 |

FOREIGN PATENT DOCUMENTS

| | | |
|---|---|---|
| 3300640 | 7/1984 | Germany . |
| 3930445 | 3/1990 | Germany . |
| 4010332 | 10/1990 | Germany . |
| 4041404 | 7/1991 | Germany . |
| 4102595 | 8/1991 | Germany . |
| 4112284 | 10/1991 | Germany . |
| 2-70561 | 3/1990 | Japan . |
| 2-194406 | 8/1990 | Japan . |

Primary Examiner—Gary Chin
Attorney, Agent, or Firm—Oliff & Berridge

[57] ABSTRACT

A vehicle control apparatus for controlling at least one running condition of a vehicle, including an intended-target-position determining device which determines an intended target position of the vehicle based on a steering angle of the vehicle; a running-state detector which detects a running state of the vehicle; an estimated-target-position determining device which determines an estimated target position of the vehicle based on the running state of the vehicle detected by the running-state detector; a vehicle-condition changing device which changes the at least one running condition of the vehicle; and a vehicle-condition control device which controls the vehicle-condition changing device based on a difference between the intended target position of the vehicle determined by the intended-target-position determining device and the estimated target position of the vehicle determined by the estimated-target-position determining device, thereby controlling the at least one running condition of the vehicle.

15 Claims, 6 Drawing Sheets

FIG.4

| | | |
|---|---|---|
| INTENDED LATERAL DISPLACEMENT $y_1$ | $y_1 = R(1 - \cos(\gamma\tau))$ (STEADY TURN) | |
| ESTIMATED LATERAL DISPLACEMENT $y_2$ | $V_y = v\cos\gamma t + u\sin\gamma t$ $(0 \leq t \leq \tau)$ $y_2 = \int_0^\tau V_y \, dt$ (TURN WITH LATERAL-SLIP SPEED) | | t=0

VEHICLE CONTROL APPARATUS

BACKGROUND OF THE INVENTION

1. Field of the Invention

The present invention relates to a vehicle control apparatus capable of controlling one or more running conditions of the vehicle.

2. Related Art Statement

Japanese Patent Application laid open for public inspection under Publication No. 2(1990)-170561 discloses a vehicle control device including (a) intended-yaw-rate determining means for determining an intended yaw rate of the vehicle based on the angle of operation of the steering wheel of the vehicle; (b) an actual-yaw-rate detector which detects an actual yaw rate of the vehicle; (c) a vehicle-condition changing device which changes a running condition of the vehicle; and (d) vehicle-condition control means for controlling the vehicle-condition changing device based on a difference between the intended yaw rate of the vehicle determined by the intended-yaw-rate determining means and the actual yaw rate detected by the actual-yaw-rate detector, thereby controlling the running condition of the vehicle.

When the vehicle is turning with the actual yaw rate being smaller than the intended yaw rate, the above-indicated conventional control device operates for increasing the braking force applied to the inside wheels; and when the vehicle is turning with the actual yaw rate being greater than the intended yaw rate, the conventional control device operates for decreasing the braking force applied to the inside wheels. In this way, the conventional control device adjusts the actual yaw rate to follow the intended yaw rate.

However, the vehicle may not be controlled by the conventional control device to reach a target position which the driver desires or intends the vehicle to reach, simply by adjusting the actual yaw rate to follow the intended yaw rate. The desired or intended target position corresponds to the angle of operation or rotation of the steering wheel by the driver. Since usually the driver operates the steering wheel in the belief that the vehicle will run according solely to the operation angle of the steering wheel, it can be said that a position corresponding to the operation angle of the steering wheel is a position the driver intends to reach. However, in the event that the vehicle is displaced or slipped in the lateral direction thereof because of, e.g., side wind, the vehicle may not reach the intended target position, even if the actual yaw rate may be adjusted to be equal to the intended yaw rate. Only with the vehicle being slipping in the lateral direction, the conventional control device will not start to adjust the actual yaw rate to follow the intended yaw rate, because the actual yaw rate will not differ from the intended yaw rate in this running state of the vehicle.

SUMMARY OF THE INVENTION

It is therefore an object of the present invention to provide a vehicle control apparatus which controls one or more running conditions of a vehicle so that the vehicle reaches a target position intended by a driver.

The above object has been achieved by the present invention. According to a first aspect of the present invention, there is provided a vehicle control apparatus for controlling at least one running condition of a vehicle, comprising intended-target-position determining means for determining an intended target position of the vehicle based on a steering angle of the vehicle; a running-state detector which detects a running state of the vehicle; estimated-target-position determining means for determining an estimated target position of the vehicle based on the running state of the vehicle detected by the running-state detector; a vehicle-condition changing device which changes the at least one running condition of the vehicle; and vehicle-condition control means for controlling the vehicle-condition changing device based on a difference between the intended target position of the vehicle determined by the intended-target-position determining means and the estimated of the vehicle determined by the estimated-target-position determining means, thereby controlling the at least one running condition of the vehicle.

In the vehicle control apparatus constructed as described above, the intended-target-position determining means determines an intended target position of the vehicle based on a steering angle of the vehicle. The intended target position is a position which the driver intends the vehicle to reach. Usually the driver is not sensitive to lateral displacement of the vehicle (hereinafter, referred to as the "lateral slip"), but is sensitive to change of the running direction of the vehicle. Thus, generally, the driver operates the steering wheel in the belief that the vehicle runs according to the angle of operation of the steering wheel. The estimated-target-position determining means determines an estimated target position of the vehicle based on the running state of the vehicle detected by the running-state detector. The estimated target position is a position which the vehicle is estimated to reach. The running-state detector may detect that the vehicle is slipping in the lateral direction. The vehicle-condition control means controls the vehicle-condition changing device based on the difference between the intended and estimated target positions of the vehicle, thereby controlling the current one or more running conditions of the vehicle. Thus, the present vehicle control apparatus controls the vehicle to actually reach a position which is less deviated from the intended target position than a position reached by the vehicle controlled by the previously-described conventional control device. That is, the present control apparatus enables the driver to more accurately run the vehicle as intended by himself or herself than the conventional control device. For example, in the case where the vehicle is slipping in the lateral direction because of an external disturbance, such as sudden side wind or abrupt change of the friction coefficient, $\mu$, of the road surface on which the vehicle is running, and therefore the difference between the intended and estimated target positions is increased, the present control apparatus automatically controls one or more current running conditions of the vehicle, so that the difference between the two target positions becomes zero. Therefore, the driver will continue to run the vehicle without recognizing the occurrence of the external disturbance to the vehicle. The angle of steering of the vehicle may be either the operation angle of the steering wheel of the vehicle or the actual steering angle of the front wheels of the vehicle. The estimated-target-position determining means may determine the estimated target position based on either only the current running state of the vehicle or both the past and current running states of the vehicle. Each of the intended and estimated target positions may be either a single point or a course consisting of a plurality of points. The vehicle-condition control means may control the vehicle-condition changing device based on the difference between the intended and estimated target courses of the vehicle.

In a preferred embodiment in accordance with the first aspect of the present invention, the vehicle-condition control means does not control the vehicle-condition changing device when an absolute value of the difference between the intended and estimated target positions of the vehicle is smaller than a reference value, and controls the vehicle-condition changing device when the absolute value of the difference is not smaller than the reference value. In the case where the absolute value of the difference is small, it may be unnecessary to effect the vehicle condition control, which the driver may feel as an excessive control.

It is an another object of the present invention to provide an apparatus for detecting an amount of lateral slip of a vehicle in a lateral direction thereof.

The above object has been achieved by the present invention. According to a second aspect of the present invention, there is provided an apparatus for detecting an amount of lateral slip of a vehicle in a lateral direction of the vehicle, relative to a road surface on which the vehicle is running, comprising a vehicle-speed sensor which detects a running speed, V, of the vehicle; a steering-angle sensor which detects an angle, $\theta$, of rotation of a steering wheel of the vehicle; a lateral-acceleration sensor which detects a lateral acceleration, $G_y$, of the vehicle in the lateral direction of the vehicle; and lateral-slip-amount determining means for determining a first lateral displacement amount, $y_1$, by which the vehicle is intended to displace from a straightly frontward position looked at by a driver operating the steering wheel at a time of detection of the running speed V and rotation angle $\theta$ of the vehicle, in a time duration, $\tau$, obtained by dividing a pre-set distance, Lp, between the driver and the straightly frontward position by the running speed V of the vehicle, according to a following first expression:

$$y_1 = \theta(V\tau)^2/\{2LN(1+KV^2)\}$$

where

L is a wheel base of the vehicle,

K is a stability factor of the vehicle, and

N is a steering gear ratio of the vehicle, and determining a second lateral displacement amount, $y_2$, by which the vehicle is estimated to displace, in the time duration $\tau$, from the straightly frontward position looked at by the driver at a time of detection of the lateral acceleration $G_y$ of the vehicle, according to a following second expression:

$$y_2 = G_y \tau^2/2,$$

the lateral-slip-amount determining means determining, as the amount of lateral slip of the vehicle, a difference between the first and second lateral displacement amounts $y_1$, $y_2$.

BRIEF DESCRIPTION OF THE DRAWINGS

The above and optional objects, features, and advantages of the present invention will be better understood by reading the following detailed description of the presently preferred embodiments of the invention when considered in conjunction with the accompanying drawings, in which:

FIG. 4 is graphs illustrating an intended and an estimated target position of a vehicle determined by the control apparatus of FIG. 1;

DETAILED DESCRIPTION OF THE PREFERRED EMBODIMENTS

Figure 1:
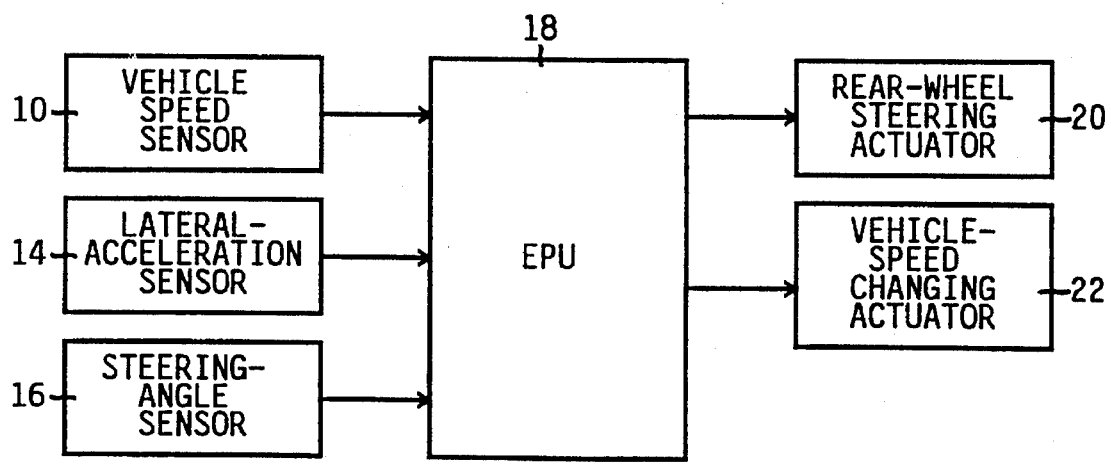
FIG. 1 is a diagrammatic view of an electric construction of a vehicle control apparatus in accordance with the present invention.

Referring first to FIG. 1, there is diagrammatically illustrated a control apparatus for an automotive four-wheel vehicle to which apparatus the present invention is applied.

In FIG. 1, reference numerals 10, 14, and 16 designate a vehicle-speed sensor, a lateral-acceleration sensor, and a steering-angle sensor, respectively. The three sensors 10, 14, 16 are connected to an input part of an electronic control unit 18 (hereinafter, referred to as the "ECU" 18) which is essentially constituted by a computer including a central processing unit (CPU), a random access memory (RAM), a read only memory (ROM), input and output parts, bus, etc. The output part of the ECU 18 is connected to a rear-wheel steering actuator 20 and a vehicle-speed changing actuator 22.

The vehicle-speed sensor 10 detects or estimates a running velocity or speed, V, of the center of gravity of the vehicle, based on the speed of rotation of the output shaft of the engine (not shown) of the vehicle.

The running speed V of the center of gravity of the vehicle is composed of a first component or speed, u, in the longitudinal direction of the vehicle and a second component or speed, v, in a lateral direction of the vehicle perpendicular to the longitudinal direction.

In the case of v=0, i.e., in the case where the vehicle is not slipping in the lateral direction thereof, the direction of running of the center of gravity of the vehicle coincides with the longitudinal direction of the vehicle, therefore the gravity-center speed V is equal to the longitudinal-direction speed u.

On the other hand, in the case of v≠0, i.e., in the case where the vehicle is slipping in the lateral direction, the gravity-center speed V is not equal to the longitudinal-direction speed u. However, since the difference between the direction of running of the center of gravity of the vehicle and the longitudinal direction of the vehicle is very small, it is assumed that the vehicle gravity-center speed V represented by the output signal of the vehicle-speed sensor 10 is equal to the longitudinal-direction speed u. Hereinafter, the vehicle gravity-center speed V is referred to as the "vehicle speed" V, and the lateral-direction speed v is referred to as the "lateral-slip speed" v.

The lateral-acceleration sensor 14 detects an acceleration, $G_y$, of the vehicle in the lateral direction of the vehicle. The sensor 14 may be constituted by a known acceleration sensor.

The steering-angle sensor 16 detects an angle, θ, of operation or rotation of the steering wheel (not shown) by the driver to steer the front wheels (not shown), from a neutral position (θ=0) of the steering wheel where the vehicle can run straightly frontward in the longitudinal direction thereof.

As will be described later, in the case where the vehicle is turning along a circle having a certain radius, R, in a steady running state in which the lateral-slip speed v is zero, the direction of the lateral acceleration $G_y$ points to the center of the turning circle, and the magnitude of the lateral acceleration $G_y$ is equal to the product of the vehicle speed V and a yaw rate, γ, of the vehicle, that is, $G_y=V\gamma$.

On the other hand, in the case where the vehicle is turning in a non-steady running state in which the vehicle is receiving an external force applied thereto in the lateral direction thereof, such as side wind, the magnitude of the lateral acceleration $G_y$ is equal to the sum of the above-indicated product Vγ and a lateral-slip acceleration v' (i.e., derivative of the lateral-slip speed v), that is, $G_y=V\gamma+v'$.

The rear-wheel steering actuator 20 is constituted by, e.g., a servo valve of a rear-wheel steering device (not shown) of the vehicle. The rear-wheel steering device changes the angle of steering of the rear wheels (not shown) of the vehicle. In the case where the rear-wheel steering device includes a hydraulic cylinder and a servo valve for regulating the supply and discharge of working fluid into and from the pressure chamber of the hydraulic cylinder, the servo valve is connected to the ECU 18 and the hydraulic cylinder is connected via the servo valve to a fluid source or reservoir (not shown). The servo valve is controlled by the ECU 18 so as to supply and discharge the working fluid into and from the pressure chamber of the hydraulic cylinder, thereby changing the steering angle of the rear wheels of the vehicle.

The vehicle-speed changing actuator 22 is constituted by, e.g., an actuating device which actuates a secondary throttle valve provided in the inlet manifold (not shown) of the engine of the vehicle. In the case where a main and a secondary throttle valve are provided in series in the inlet manifold of the engine, the main throttle valve is connected to the accelerator pedal of the vehicle and the secondary throttle valve is connected to the ECU 18. When the degree of opening of the secondary throttle valve is decreased, the amount of supply of the air/fuel mixture to the combustion chamber of the engine is reduced so as to lower the vehicle speed V, irrespective of the degree of operation or depression of the accelerator pedal which degree is indicative of driver's intention.

Figure 2:
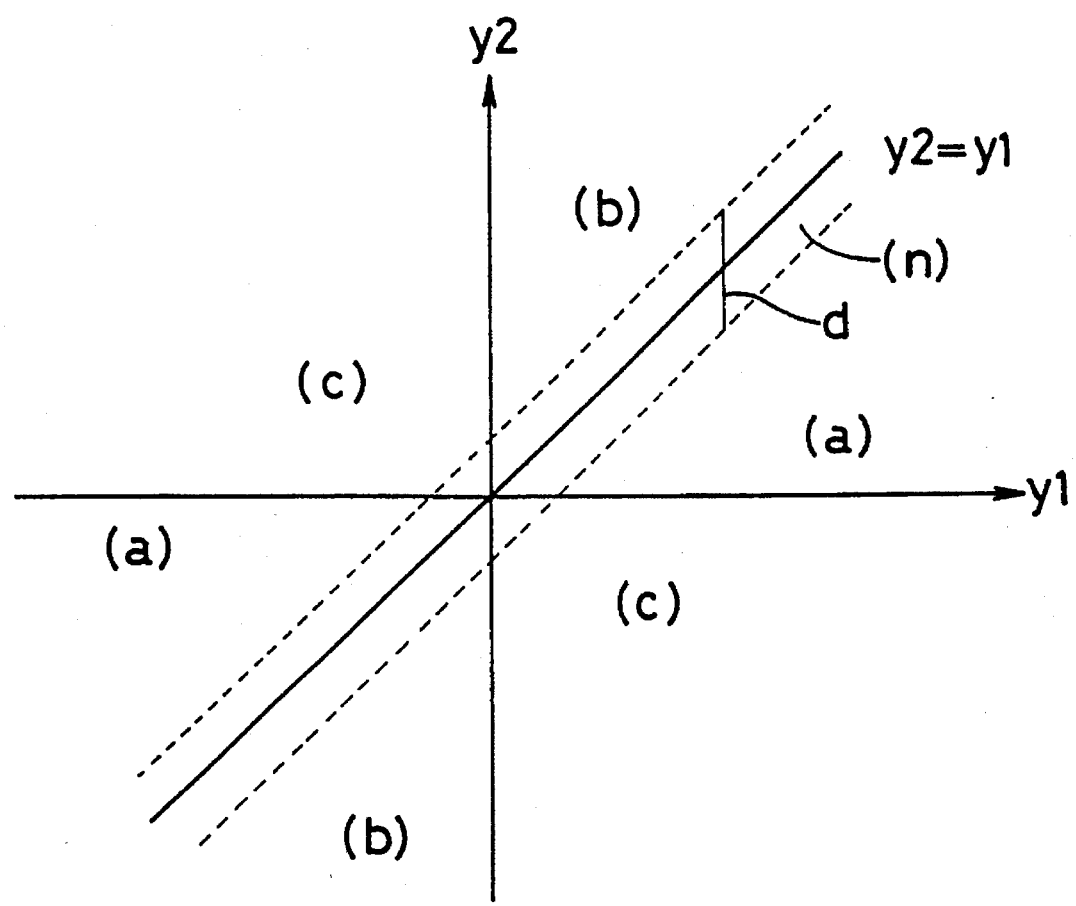
FIG. 2 is a graph representing a look-up table pre-stored in a read only memory (ROM) of an electronic control unit (ECU) of the control apparatus of FIG. 1.
Figure 3:
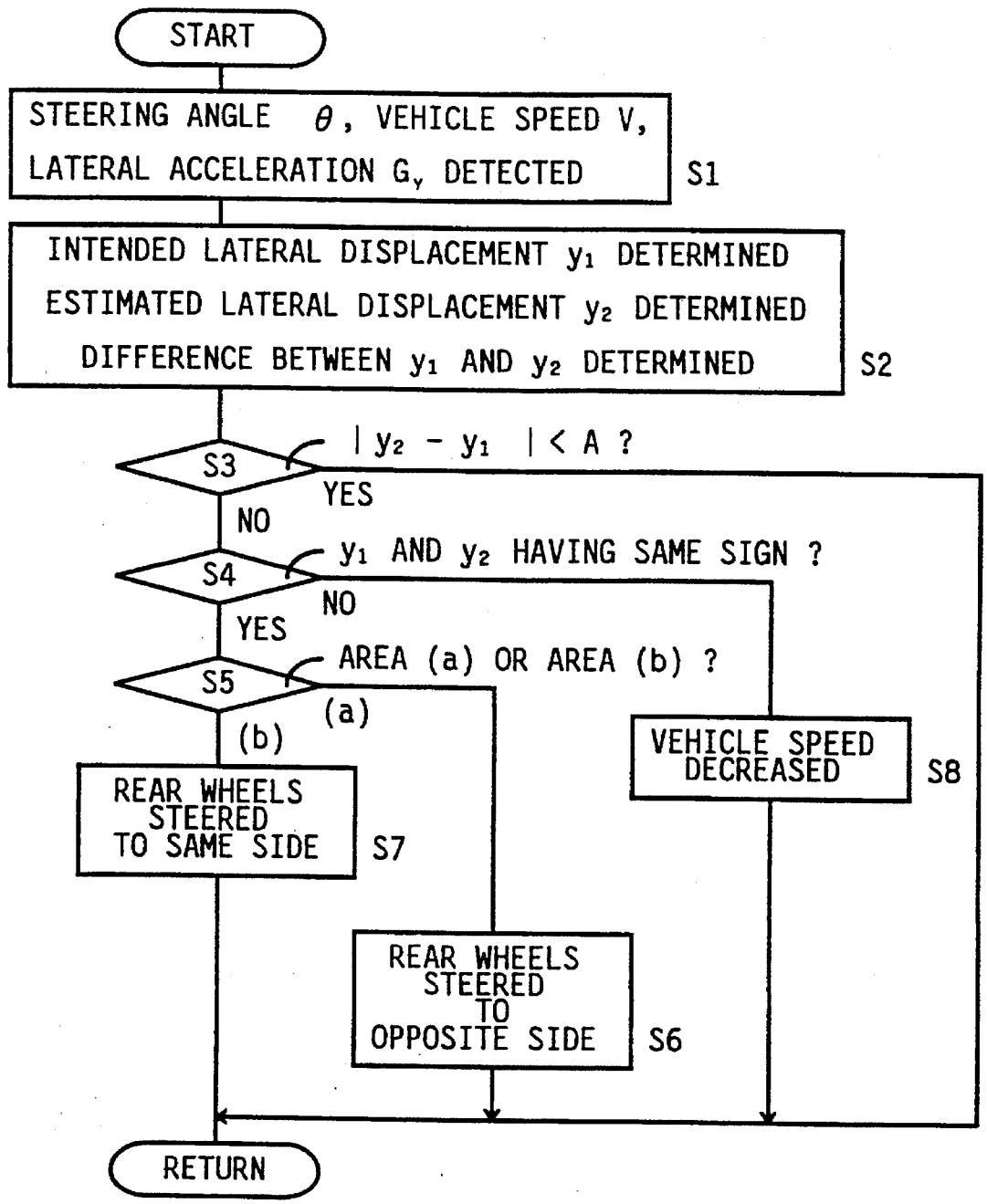
FIG. 3 is a flow chart representing a control program pre-stored in the ROM of the ECU of the control apparatus of FIG. 1.

The ROM of the ECU 18 stores a look-up table represented by the graph shown in FIG. 2, and a running-condition control program represented by the flow chart of FIG. 3.

The ECU 18 determines an intended target position and an estimated target position of the vehicle based on the output signals of the above-described three sensors 10, 14, 16, and controls the rear-wheel steering actuator 20 or vehicle-speed changing actuator 22 based on the difference between the intended and estimated target positions.

Hereinafter, there will be described the manner of determination of the intended and estimated target positions by the present vehicle control apparatus.

In the present embodiment, the intended target position of the vehicle is defined as a position where the vehicle is intended by the driver to reach in a time duration, τ, (i.e., t=τ) after the time of detection (i.e., t=0) of the vehicle speed V, steering angle θ, and lateral acceleration $G_y$, and the estimated target position of the vehicle is defined as a position where the vehicle is estimated to reach at the time t=τ.

As illustrated in FIG. 4, the intended target position may be represented by a lateral displacement amount, $y_1$, by which the vehicle is intended by the driver to deviate in the time duration τ (i.e., t=τ) from the X axis, and parallel to the Y axis, of an orthogonal X-Y coordinate system fixed to the vehicle at the time of zero (i.e., t=0). The X and Y axes of the X-Y coordinate system are perpendicular to each other, and are indicative of the longitudinal and lateral directions of the vehicle at the time t=0, respectively. Similarly, the estimated target position may be represented by a lateral displacement amount, $y_2$, by which the vehicle is estimated to deviate at the time t=τ from the X axis and parallel to the Y axis. In the following description, it is assumed that, during the time duration τ, the vehicle speed V, steering angle θ, yaw rate γ, and lateral acceleration $G_y$ each are not changed and that the vehicle has not been brought into a critical running state in which the steering angle θ and the yaw rate γ do not maintain a linear relationship with each other.

Assuming that the vehicle is turning along the circle corresponding to the steering angle θ of the steering wheel operated by the driver, in the steady running state in which the lateral-slip speed v is zero (i.e., v=0), the intended lateral displacement $y_1$ is determined based on the radius R of the turning circle, according to the following expression (1):

$$y_1=R\{1-\cos(\gamma t)\} \tag{1}$$

The time t=τ may be determined according to the "frontward-looking and steering model" in which it is assumed that the driver operates the steering wheel while looking at a straightly frontward position on the X axis of the X-Y coordinate system at the time t=0. In this case, the time τ is obtained by dividing, by the vehicle speed V (V=u), the distance between the driver operating the steering wheel in the vehicle and the straightly frontward position looked at by the driver through the windshield. Usually the time τ falls within the range of about 0.1 to 1.5 seconds. The data indicative of the above-indicated frontward distance (Lp, FIG. 6) are pre-stored in the ROM of the ECU 18. Since the time τ and yaw rate γ may be regarded as being very small relative to the radius R of the turning circle, the value, cos(γt), in the expression (1) may be approximated by a value, $\{1-(\gamma t)^2/2\}$. Therefore, the intended lateral displacement $y_1$ is obtained according to the following expression:

$$y_1=R(\gamma t)^2/2 \tag{2}$$

The estimated lateral displacement $y_2$ is determined based on the current running state of the vehicle.

As illustrated in FIG. 4, since the longitudinal and lateral directions of the vehicle with respect to the X and Y axes of the X-Y coordinate system at the time t=0 change as the vehicle turns during the time duration τ, the estimated lateral displacement $y_2$ cannot accurately be determined by simply integrating the lateral-slip speed v from the time t=0 to the time t=τ. Thus, it is necessary to take into consideration the Y-direction components of both the lateral-slip speed v and longitudinal-direction speed u of the vehicle speed V at an arbitrary time t=t between the time t=0 and the time t=τ. The composite Y-direction speed, $V_y$, of the respective Y-direction components of the above-indicated two speeds v and u is obtained by the following expression (3):

$$V_y=v\cos(\gamma t)+u\sin(\gamma t) \tag{3}$$

Meanwhile, as described previously, the longitudinal-direction speed u may be approximated by the vehicle speed V. Therefore, when the yaw rate $\gamma$ and the time duration $\tau$ each are very small, the value, $\sin(\gamma t)$, may be approximated by a value, $\gamma t$, and the value, $\cos(\gamma t)$, may be approximated by a value, one. Thus, the Y-direction speed $V_y$ may be obtained by the following expression (4):

$$V_y = v + V\gamma t \tag{4}$$

Assuming that the lateral-slip speed v is not changed during the time duration $\tau$ between the time t=0 and the time t=$\tau$, the lateral displacement amount $y_2$ is estimated according to the following expression (5) obtained by integrating the Y-direction speed $V_y$ from the time t=0 to the time t=$\tau$:

$$y_2 = v t + V\gamma \tau^2/2 \tag{5}$$

In the present embodiment, however, the lateral-slip speed v is not directly detected, but the output signal Gy of the lateral-acceleration sensor 14 is utilized as described below. Alternatively, the present vehicle control apparatus may be adapted to include a lateral-slip-speed sensor which directly detects the lateral-slip speed v of the vehicle.

As described previously, the output signal $G_y$ of the lateral-acceleration sensor 14 is indicative of the sum of the acceleration $V\gamma$ resulting from the turning of the vehicle and the lateral-slip acceleration v' resulting from an external disturbance such as side wind. Assuming that an initial lateral position, $y_0$, and an initial lateral-slip speed, $v_0$, at the time t=0 are both zero and that an initial signal magnitude $G_{y0}$ is suddenly changed (i.e., increased or decreased) from zero to the value $G_y$ at the time t=0 and is not changed during the time duration $\tau$, the lateral displacement amount $y_2$ is determined according to the following expression (6) obtained by two times integrating the output signal $G_y$ from the time t=0 to the time t=$\tau$:

$$y_2 = G_y \tau^2/2 \tag{6}$$

Assuming that the lateral-slip acceleration v' and lateral-slip speed v are both zero, the lateral acceleration $G_y$ is equal to the value, $V\gamma$, and the estimated lateral displacement $y_2$ is equal to a value, $V\gamma\tau^2/2$. Since the vehicle speed V is equal to the product of the turning-circle radius R and the yaw rate $\gamma$, the expression (6) is rewritten into the following expression (7):

$$y_2 = R(\tau\gamma)^2/2 \tag{7}$$

This expression (7) is equal to the expression (2), from which it emerges that, if the actual yaw rate is controlled to be equal to the intended yaw rate, the estimated lateral displacement $y_2$ will continue to coincide with the intended lateral displacement $y_1$.

However, in the case where the vehicle is slipping in the lateral direction because of an external disturbance, such as side wind or sudden change of the friction coefficient $\mu$ of the road surface on which the vehicle is running, or in the case where the vehicle has an under-steer (US) characteristic or an over-steer (OS) characteristic, the lateral-slip speed v or lateral-slip acceleration v' is not zero.

Figure 5:
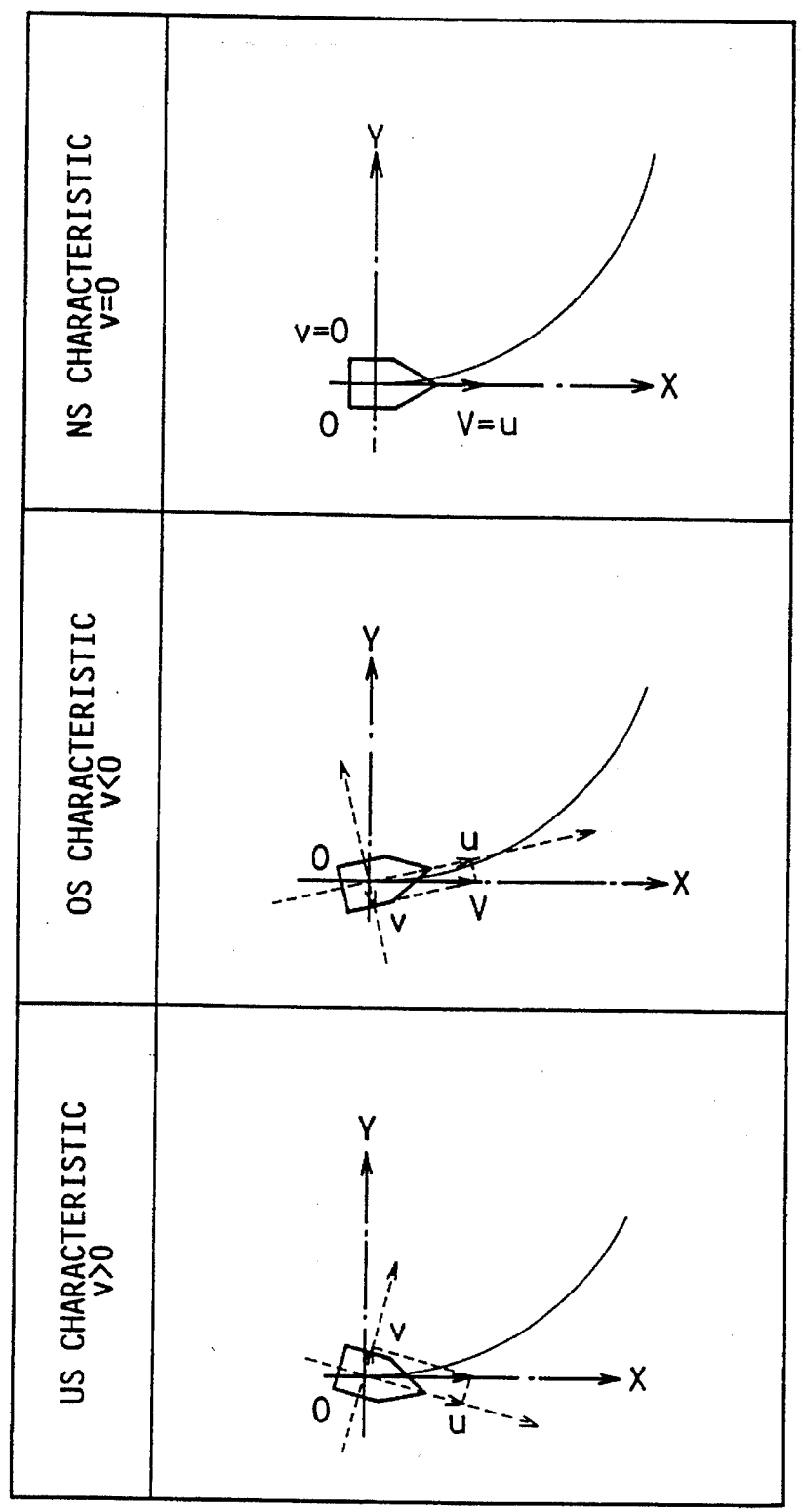
FIG. 5 is graphs illustrating a relationship between a neutral-steer (NS), an over-steer (OS), or an under-steer (US) characteristic of a vehicle and a lateral-slip speed, v, of the vehicle.

As illustrated in FIG. 5, in a vehicle which has the neutral-steer (NS) characteristic, the vehicle speed V is equal to the longitudinal-direction speed u. However, in a vehicle with the US or OS characteristic, the two speeds V, u are not equal with each other. That is, the lateral-direction speed v is not zero. In a vehicle with the OS characteristic, the lateral-direction speed v is smaller than zero (i.e., v<0; v is negative with respect to the Y axis of the X-Y coordinate system). On the other hand, in a vehicle with the US characteristic, the lateral-direction speed v is greater than zero (i.e., v>0; v is positive with respect to the Y axis).

In the case where the lateral-slip speed v or lateral-slip acceleration v' is not zero, the estimated lateral displacement $y_2$ will not coincide with the intended lateral displacement $y_1$, even if the actual yaw rate is controlled to be equal to the intended yaw rate. In contrast, as described later, the present vehicle control apparatus is capable of controlling, even when the lateral-slip speed v or lateral-slip acceleration v' is not zero, one or more running conditions of the vehicle so that the difference between the intended and estimated lateral displacements $y_1$, $y_2$ becomes zero. The present control apparatus may start the running-condition control before the vehicle is brought into a pre-critical running state in which the conventional control apparatus starts to control the actual yaw rate so as to follow the intended yaw rate.

Figure 6:
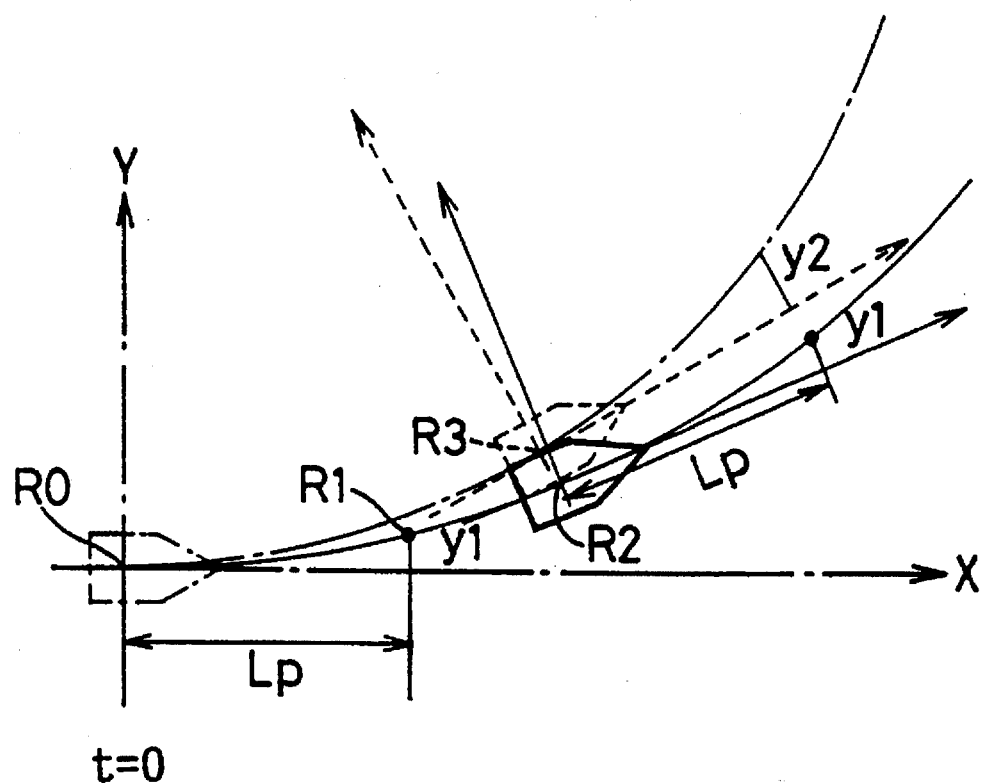
FIG. 6 is a graph illustrating the difference between an intended and an estimated lateral displacement $y_1$, $y_2$ of a vehicle, which difference indicates that the vehicle is not being running according solely to the angle of operation of the steering wheel by the driver and thus makes the driver feel uneasiness.

As illustrated in FIG. 6, the driver feels the difference, ($y_2-y_1$), between the intended and estimated lateral displacement amounts $y_1$, $y_2$. Usually the driver operates the steering wheel while recognizing the distance $y_1$ of an intended target position, $R_1$, from the longitudinal-direction axis of the vehicle (i.e., X axis of the X-Y coordinate system) at the time t=0. More specifically, at the time t=0 (i.e., current point of time), the driver specifies the intended target position $R_1$ and recognizes the lateral displacement amount $y_1$ of the intended target point $R_1$ from a straightly frontward position which is looked at by the driver operating the steering wheel in the vehicle and which is spaced by a distance, Lp, from the driver in the vehicle. Assuming that the vehicle is running along a first course indicated in solid line, the center of gravity of the vehicle is moved from an initial position, $R_0$, to the position $R_1$ and then to a position, $R_2$. If, between the positions $R_0$ and $R_2$, the driver does not change the steering angle $\theta$ and the vehicle is not slipping in the lateral direction because of an external disturbance such as side wind, the intended lateral displacement amount $y_1$ at the position $R_2$ is equal to that at the initial position $R_0$.

On the other hand, assuming that the vehicle is running along a second course indicated in one-dot chain line, without change of the steering angle $\theta$ but with an external disturbance, the center of gravity of the vehicle is estimated to move from the initial position $R_0$ to a position, $R_3$. In this case, the estimated lateral displacement $y_2$ at the frontward distance Lp is different from the intended lateral displacement $y_1$, because the vehicle is slipping in the lateral direction because of the external disturbance. Thus, the driver feels the difference ($y_2-y_1$) between the two lateral displacements $y_1$, $y_2$.

For preventing the driver from feeling uneasiness due to the above-indicated difference between the two lateral displacements $y_1$, $y_1$, the present vehicle control apparatus controls the running condition or conditions of the vehicle in a manner described below.

There will be described the manner of control of the vehicle effected by the present control apparatus.

In the case where the absolute value, $|y_2-y_1|$, of the difference between the two lateral displacements $y_1$, $y_2$ is smaller than a reference value, A (>0), the coordinates ($y_1$, $y_2$) falls in an area, (n), of the graph of FIG. 2, and no control of the vehicle is effected by the present control apparatus. In the present embodiment, the reference value A is pre-selected at a value equal to the width, d, of a traffic lane, and the data indicative of the value A or d are stored in the ROM of the ECU 18. When the value $|y_2-y_1|$ is smaller than the reference value d, the vehicle will not deviate out of the lane and therefore it is not necessary to effect the vehicle-condition control.

In the case where the signs of the two lateral displacements $y_1$, $y_2$ are both positive and simultaneously the difference $(y_2-y_1)$ is smaller than a reference value, $-d/2$, or in the case where the signs of the two lateral displacements $y_1$, $y_2$ are both negative and simultaneously the difference $(y_2-y_1)$ is greater than a reference value, $d/2$, the coordinates $(y_1, y_2)$ falls in an area, (a), of the graph of FIG. 2. In each case, the rear-wheel steering actuator 20 is operated to steer the rear wheels to the phase or side opposite to the side to which the front wheels are being steered through operation of the steering wheel. Since in these cases the estimated lateral displacement $y_2$ is insufficiently small in comparison with the intended lateral displacement $y_1$, the yawing of the vehicle is enhanced.

Meanwhile, in the case where the signs of the two lateral displacements $y_1$, $y_2$ are both positive and simultaneously the difference $(y_2, y_1)$ is greater than the reference value $d/2$, or in the case where the signs of the two lateral displacements $y_1$, $y_2$ are both negative and simultaneously the difference $(y_2-y_1)$ is smaller than the reference value $-d/2$, the coordinates $(y_1, y_2)$ fall in an area, (b), of the graph of FIG. 2. In each case, the rear-wheel steering actuator 20 is operated to steer the rear wheels to the same side as the side to which the front wheels are being steered through operation of the steering wheel. Since in these cases the estimated lateral displacement $y_2$ is excessively large in comparison with the intended lateral displacement $y_1$, the yawing of the vehicle is restrained.

The angle, $\delta$, of steering of the rear wheels by the rear-wheel steering device is determined according to the following expression (8):

$$\delta = K_1 |y_2 - y_1| + K_2 \theta \quad (8)$$

where $K_1$, $K_2$ are gains.

The gain $K_1$ is not a constant value but increases, as the absolute value $|y_2-y_1|$ increases, according to a look-up table (not shown) pre-stored in the ROM of the ECU 18. The gain $K_2$ is a constant value, but the second term $K_2\theta$ may be omitted from the expression (8).

In the case where the coordinates $(y_1, y_2)$ do not fall in any of the areas (n), (a), (b), that is, fall in an area, (c), of the graph of FIG. 2, the vehicle-speed changing actuator 22 is operated to reduce the degree of opening of the secondary throttle valve provided in the inlet manifold of the engine. That is, in the case where the signs of the two lateral displacements $y_1$, $y_2$ are different from each other and simultaneously the absolute value $|y_2-y_1|$ is greater than the reference value $d/2$, it is estimated that the running state of the vehicle is unstable. Hence, the vehicle speed V is lowered for improving the degree of driving safety.

It emerges from the foregoing description that the present vehicle control apparatus controls the current running condition or conditions of the vehicle based on the difference between the intended and estimated lateral displacements $y_1$, $y_2$, so that the estimated displacement $y_2$ will be equal to the intended displacement $y_1$, i.e., the difference between the two displacements $y_1$, $y_2$ will become zero. Since the conventional control apparatus controls the actual yaw rate so as to be equal to the intended yaw rate, the difference or distance between the intended and estimated target positions may be increased when the vehicle is slipping in the lateral direction. In contrast, the present control apparatus controls the vehicle so that the difference between the intended and estimated and target positions will become zero.

While the difference between the intended and estimated lateral displacements $y_1$, $y_2$ is smaller than the reference value d corresponding to the width of one traffic lane, the present control apparatus does not start the vehicle-condition control. When the vehicle is running in a normal manner with, e.g., usual change of the steering angle of the steering wheel, there is substantially no case where the absolute value $|y_2-y_1|$ becomes greater than the reference value d. When the vehicle is receiving a sudden disturbance, such as sudden side wind or abrupt and large change of the friction coefficient $\mu$ of the road surface, the absolute value $|y_2-y_1|$ may become greater than the reference value d, so that the present control apparatus starts the vehicle-condition control.

There will be described the operation of the vehicle control apparatus constructed as described above, by reference to the flow chart of FIG. 3.

First, at Step S1, the CPU of the ECU 18 reads in the current vehicle speed V, steering angle $\theta$, and lateral acceleration $G_y$ (at the time $t=0$) from the output signals of the respective sensors 10, 14, 16. Step S1 is followed by Step S2 to determine an intended lateral displacement $y_1$ and an estimated lateral displacement $y_2$, and determine the difference $(y_2-y_1)$ between the two displacements $y_1$, $y_2$.

The intended lateral displacement $y_1$ is determined according to the above-indicated expression (2); $y_1=R(\gamma t)^2/2$. The radius R of the turning circle is determined according to the following expression (9):

$$R = LN(1+KV^2)/\theta \quad (9)$$

where

L is a wheel base of the vehicle,

K is a stability factor of the vehicle, and

N is a steering gear ratio of the vehicle.

Each of the values L, K, N is a constant value. Meanwhile, the yaw rate $\gamma$ may be expressed by V/R (i.e., $\gamma=V/R$ . . . (10)). The radius R and yaw rate $\gamma$ in the expression (2) are replaced with the expressions (9) and (10), the intended lateral displacement $y_1$ is determined according to the following expression (11):

$$y_1 = \theta(V\tau)^2/\{2LN(1+KV^2)\} \quad (11)$$

Since the data indicative of the known values L, N, K are pre-stored in the ROM of the ECU 18, the intended lateral displacement $y_1$ is obtained by replacing the unknown values V, $\theta$ in the expression (11), with the corresponding actual vehicle speed V and steering angle $\theta$ detected at Step S1, respectively. The time $\tau$ may be determined in the previously-described manner.

Meanwhile, the estimated lateral displacement $y_2$ is obtained by replacing the unknown values $\tau$, $G_y$ in the previously-indicated expression (6); $y_2=G_y\tau^2/2$, with the time $\tau$ and the actual lateral acceleration $G_y$ detected at Step S1.

Step S2 is followed by Step S3 to judge whether the absolute value, $|y_2-y_1|$, of the difference $(y_2-y_1)$ determined at Step S2 is smaller than the reference value A (i.e., d). If a positive judgment is made at Step S3, it means that the coordinates $(y_1, y_2)$ fall in the area (n) of the graph of FIG. 2, so that the control apparatus does not effect any vehicle-condition control. On the other hand, if a negative judgment is made at Step S3, the control of the ECU 18 goes to Step S4 to judge whether the intended and estimated lateral displacements $y_1$, $y_2$ have a same sign. If a positive judgment is made at Step S4, the control goes to Step S5 to judge whether the coordinates $(y_1, y_2)$ fall in the area (a) or the area (b) of the graph of FIG. 2, based on the value of the difference $(y_2-y_1)$ and the respective signs of the two displacement amounts $y_1$, $y_2$. As described previously, if it is judged at Step S5 that the coordinates ($y_1$, $y_2$) fall in the area (a), the control of the ECU 18 goes to Step S6 to operate the rear-wheel steering actuator 20 so as to steer the rear wheels to the phase or side opposite to the side to which the front wheels are being steered by the driver through operation or rotation of the steering wheel. On the other hand, if it is judged at Step S5 that the coordinates ($y_1$, $y_2$) fall in the area (b), the control of the ECU 18 goes to Step S7 to operate the rear-wheel steering actuator 20 so as to steer the rear wheels to the same side as the side to which the front wheels are being steered by the driver.

Meanwhile, if the intended and estimated lateral displacements $y_1$, $y_2$ have different signs, that is, if a negative judgment is made at Step S4, it means that the coordinates ($y_1$, $y_2$) fall in the area (c) of the graph of FIG. 2. In this case, the control of the ECU 18 goes to Step S8 to operate the vehicle-speed changing actuator 22 so as to reduce the degree of opening of the secondary throttle valve provided in the inlet manifold of the engine and thereby lower the running speed V of the vehicle.

As is apparent from the foregoing description, the present vehicle control apparatus controls the current one or more running conditions of the vehicle based on the difference ($y_2-y_1$) so that the vehicle may actually displace by the lateral distance $y_1$ intended by the driver. Additionally, when the behavior of the vehicle is found to be unstable, the control apparatus automatically lowers the running speed V of the vehicle.

In the event that the vehicle is slipping in the lateral direction because of side wind which the vehicle receives, e.g., when exiting out of a tunnel of a freeway, the present control apparatus effectively prevents the vehicle from deviating out of the traffic lane on which the vehicle is running, without needing the driver's quick response or action. Also, in the event that the vehicle is slipping in the lateral direction because of abrupt and large change of the friction coefficient $\mu$ of the road surface on which the vehicle is running, the present control apparatus advantageously prevents the vehicle from largely deviating from a target position intended by the driver.

Moreover, in the event that the vehicle is running in a direction opposite to a direction in which the steering wheel is operated or rotated by the driver, for example, on a snowy or icy road surface, and the difference between the two directions becomes great, the present control apparatus operates for lowering the running speed V of the vehicle and thereby improving the running stability of the vehicle.

While the present invention has been described in detail in its preferred embodiment, the present invention may otherwise be embodied.

For example, although in the illustrated embodiment the intended and estimated target positions are represented by the lateral displacement amounts $y_1$, $y_2$, respectively, it is possible that each of the intended and estimated target positions be represented by a tangent, $\phi$, obtained by dividing the corresponding lateral displacement amount $y_1$, $y_2$ by the frontward distance Lp. Moreover, while in the illustrated embodiment the control apparatus determines the single intended or estimated target position, the control apparatus may be adapted to determine an intended or estimated target course consisting of a plurality of intended or estimated target positions.

Although in the illustrated embodiment the intended and estimated lateral displacements $y_1$, $y_2$ are determined on the assumption that, during the time duration from the time t=0 to the time t=$\tau$, the vehicle speed V, lateral acceleration $G_y$, steering angle $\theta$, and yaw rate $\gamma$ does not change, it is possible to adapt the control apparatus to determine the displacements $y_1$, $y_2$ on an assumption that one or more of the parameters V, $G_y$, $\theta$, $\gamma$ change according to corresponding pre-determined function expressions. In this case, the control apparatus may be adapted to determine the function expression or expressions based on the stored data of the parameters V, $G_y$, $\theta$, $\gamma$ detected before the time t=0.

In the illustrated embodiment, the control apparatus controls the running condition of the vehicle by operating the rear-wheel steering actuator 20, when the coordinates ($y_1$, $y_2$) fall in the area (a) or (b) of the graph of FIG. 2. However, it is possible to adapt the control apparatus to operate a braking-force control device, a driving-force control device, or a suspension control device (not shown) of the vehicle, each for controlling the yawing of the vehicle.

In the case of operating the braking-force control device, the control apparatus may be adapted to regulate the hydraulic pressure applied to the wheel cylinder associated with each of the four wheels of the vehicle. This is called the "braking-force distributing operation". In the event that the coordinates ($y_1$, $y_2$) fall in the area (a) of the graph of FIG. 2, an increased proportion of the braking force is distributed to the rear wheels so as to reduce the radius R of the turning circle. It is also possible to distribute different proportions of the braking force to the left and right wheels of the front or rear wheels, respectively. In these cases, an anti-lock braking system (not shown) of the vehicle may be utilized for the braking-force distributing operation. Since an exclusive braking-force distributing device is not necessary as the vehicle-condition changing device, the production cost of the present control apparatus is reduced.

In the case of operating the driving-force control device, the control apparatus may be adapted to regulate the working fluid supplied to the differential limiting device (not shown) of the central differential arrangement (not shown) of the vehicle, so as to control the respective driving forces transmitted to the front and rear wheels. As the amount of supply of the working fluid to the differential limiting device is increased, the rotation of the front or rear wheels is restrained by an increased amount, so that the radius R of the turning circle is increased. On the other hand, as the supply amount of the working fluid is reduced, the turning-circle radius R is decreased. In the event that the coordinates ($y_1$, $y_2$) fall in the area (a) of the graph of FIG. 2, the vehicle control apparatus operates for reducing the supply amount of the working fluid and thereby decreasing the turning-circle radius R.

In the case of operating the suspension control device, the vehicle control apparatus may be adapted to change the roll stiffness of each of the wheels. When the coordinates ($y_1$, $y_2$) fall in the area (a), the control apparatus operates for increasing the roll stiffness of each wheel and thereby preventing the vehicle from largely rolling. This results in decreasing the turning-circle radius R. Decreasing the turning-circle radius R may be effected by distributing a decreased roll stiffness to the rear wheels, or decreasing the torsional rigidity of the stabilizer or anti-roll bar (not shown) of the rear wheels.

In the illustrated embodiment, the vehicle control apparatus operates for reducing the degree of opening of the secondary throttle valve, when the coordinates ($y_1$, $y_2$) fall in the area (c) of the graph of FIG. 2. However, the control apparatus may be adapted to increase the reduction gear ratio of the automatic transmission (not shown) of the vehicle. When the reduction gear ratio is increased over the current vehicle speed V or current degree of opening of the main throttle valve, the vehicle speed V is lowered.

The lateral-acceleration sensor 14 used in the illustrated embodiment may be replaced with a lateral-slip-speed sensor, as previously described. The reference value A used for defining the area (n) in the graph of FIG. 2 is pre-selected at the value corresponding to the width d of one traffic lane in the illustrated embodiment. However, it is possible to employ, as the value d, a different value such as seventy or eighty percent of the width d of one lane.

Furthermore, the vehicle control apparatus may be adapted to determine the intended or estimated target position by taking into consideration a time delay between input of an external disturbance, such as side wind or μ change, and actual change of the running condition or conditions of vehicle.

It is to be understood that the present invention may be embodied with other changes, improvements, and modifications that may occur to those skilled in the art without departing from the scope and spirit of the invention defined in the appended claims.

What is claimed is:

1. A vehicle control apparatus for controlling at least one running condition of a vehicle, comprising:

intended-target-position determining means for determining an intended target position of the vehicle based on a steering angle of the vehicle;

a running-state detector which detects a running state of the vehicle;

estimated-target-position determining means for determining an estimated target position of the vehicle based on said running state of the vehicle detected by said running-state detector;

a vehicle-condition changing device which controls said at least one running condition of the vehicle; and vehicle-condition control means for controlling said vehicle-condition changing device based on a difference between said intended target position of the vehicle determined by said intended-target-position determining means and said estimated target position of the vehicle determined by said estimated-target-position determining means, thereby controlling said at least one running condition of the vehicle.

2. An apparatus according to claim 1, wherein said intended-target-position determining means determines, as said intended target position of the vehicle, a position where the vehicle is intended to reach in a set time duration, τ, after a time of detection of said steering angle and said running state of the vehicle, and said estimated-target-position determining means determines, as said estimated target position of the vehicle, a position where the vehicle is estimated to reach in said set time duration τ.

3. An apparatus according to claim 1, wherein said intended-target-position determining means determines, as said intended target position of the vehicle, a lateral displacement amount, $y_1$, by which the vehicle is intended to displace from a straightly frontward position looked at by a driver operating a steering wheel of the vehicle at a time of detection of said steering angle and said running state of the vehicle, and said estimated-target-position determining means determines, as said estimated target position of the vehicle, a lateral displacement amount, $y_2$, by which the vehicle is estimated to displace from said straightly frontward position.

4. An apparatus according to claim 3, further comprising a vehicle-speed sensor which detects a running speed, V, of the vehicle; and a steering-angle sensor which detects, as said steering angle of the vehicle, an angle, θ, of rotation of the steering wheel of the vehicle, said intended-target-position determining means determining said lateral displacement amount $y_1$ based on said running speed V of the vehicle detected by said vehicle-speed sensor and said rotation angle θ of the steering wheel detected by said steering-angle sensor.

5. An apparatus according to claim 4, wherein said intended-target-position determining means determines said lateral displacement amount $y_1$ by which the vehicle is intended to displace in a time duration, τ, obtained by dividing, by said running speed V of the vehicle, a pre-set distance, Lp, between the driver operating the steering wheel and said straightly frontward position, after a time of detection of said running speed V of the vehicle and said rotation angle θ of the steering wheel, according to a following expression:

$$y_1=\theta(V\tau)^2/\{2LN(1+KV^2)\}$$

where

L is a wheel base of the vehicle,

K is a stability factor of the vehicle, and

N is a steering gear ratio of the vehicle.

6. An apparatus according to claim 3, wherein said running-state detector comprises a lateral-acceleration sensor which detects a lateral acceleration, $G_y$, of the vehicle in a lateral direction of the vehicle, said estimated-target-position determining means determining said lateral displacement amount $y_2$ based on said lateral acceleration $G_y$ of the vehicle detected by said lateral-acceleration sensor.

7. An apparatus according to claim 6, wherein said estimated-target-position determining means determines said lateral displacement amount $y_2$ by which the vehicle is estimated to displace in a time duration, τ, obtained by dividing, by a running speed, V, of the vehicle, a pre-set distance, Lp, between the driver operating the steering wheel in the vehicle and said straightly frontward position, after a time of detection of said lateral acceleration $G_y$ and said running speed V of the vehicle, according to a following expression:

$$y_2=G_y\tau^2/2.$$

8. An apparatus according to claim 1, wherein said vehicle-condition changing device comprises an actuator which changes a steering angle of rear wheels of the vehicle, said vehicle-condition control means controlling said actuator, thereby controlling yawing of the vehicle.

9. An apparatus according to claim 1, wherein said vehicle-condition changing device comprises an actuator which reduces a running speed of the vehicle, said vehicle-condition control means controlling said actuator, thereby reducing said running speed of the vehicle.

10. An apparatus according to claim 1, wherein said vehicle-condition changing device comprises a braking-force distributing device which distributes a braking force of the vehicle to front wheels and rear wheels of the vehicle, said vehicle-condition control means controlling said braking-force distributing device, thereby controlling yawing of the vehicle.

11. An apparatus according to claim 1, wherein said vehicle-condition changing device comprises a driving-force distributing device which distributes a driving force of the vehicle to front wheels and rear wheels of the vehicle, said vehicle-condition control means controlling said driving-force distributing device, thereby controlling yawing of the vehicle.

12. An apparatus according to claim 1, wherein said vehicle-condition changing device comprises a roll-stiffness changing device which changes a roll stiffness of the vehicle, said vehicle-condition control means controlling said roll-stiffness changing device, thereby controlling yawing of the vehicle.

13. An apparatus according to claim 1, wherein said vehicle-condition control means controls said vehicle-condition changing device, thereby controlling said at least one running condition of the vehicle, so that said difference between said intended and estimated target positions becomes zero.

14. An apparatus according to claim 1, wherein said vehicle-condition control means does not control said vehicle-condition changing device when an absolute value of said difference between said intended and estimated target positions of the vehicle is smaller than a reference value, and controls said vehicle-condition changing device when said absolute value of said difference is not smaller than said reference value.

15. An apparatus according to claim 1, wherein said vehicle-condition changing device comprises means for controlling said at least one running condition of the vehicle, said at least one running condition is selected from the group consisting of: (a) a steering angle of rear wheels of the vehicle, (b) a running speed of the vehicle, (c) a braking force of the vehicle, (d) a driving force of the vehicle, and (e) a roll stiffness of the vehicle.

* * * * *